P. S. BAUER.
ADHESIVE PLASTER SPOOL.
APPLICATION FILED APR. 28, 1913.
1,080,508.
Patented Dec. 2, 1913.
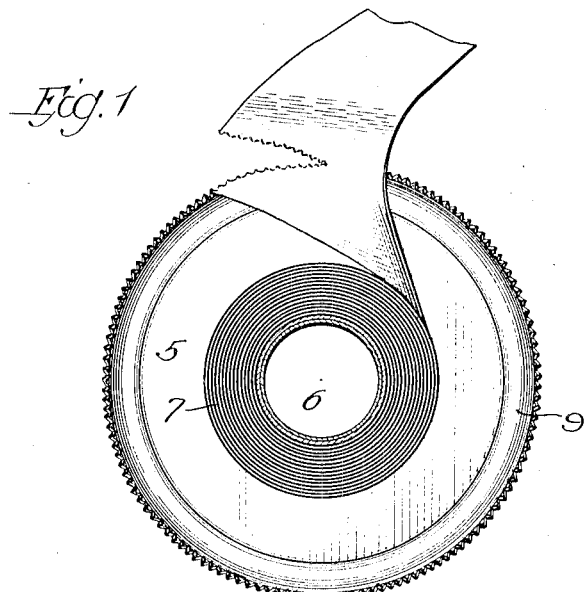
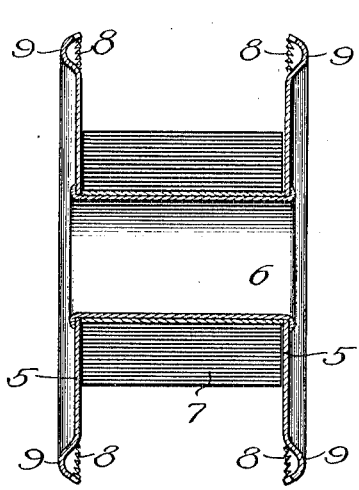
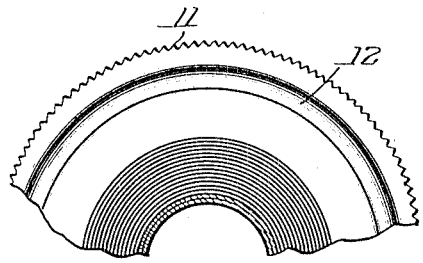
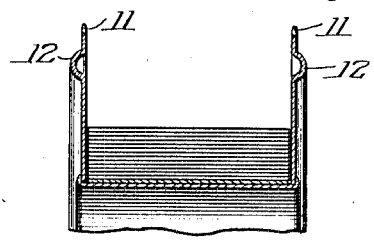

UNITED STATES PATENT OFFICE.

PERRY S. BAUER, OF CHICAGO, ILLINOIS, ASSIGNOR TO BAUER & BLACK, OF CHICAGO, ILLINOIS, A CORPORATION OF ILLINOIS.

ADHESIVE-PLASTER SPOOL.

1,080,508.   Specification of Letters Patent.   Patented Dec. 2, 1913.

Application filed April 28, 1913. Serial No. 764,037.

*To all whom it may concern:*

Be it known that I, PERRY S. BAUER, a citizen of the United States, residing at Chicago, in the county of Cook and State of Illinois, have invented certain new and useful Improvements in Adhesive-Plaster Spools, of which the following is a specification.

My present invention relates to spools for plaster bandages and the like and has for its object broadly to provide new and improved means for cutting off portions of the bandage or other material wound upon the spool.

A further object of the invention is to construct a plaster spool or device of like character provided with means for cutting off desired portions of the material wound thereon which will consist of a minimum number of simple and cheaply constructed parts.

Additional objects and advantages of the invention will be apparent from the following description taken in connection with the accompanying drawing illustrating two preferred embodiments thereof.

On the drawing: Figure 1 is a sectional view taken between and parallel to the side walls of a spool embodying my invention; Fig. 2 is a sectional view taken on the diameter of the side wall; and Figs. 3 and 4 are partial sectional views taken similarly to Figs. 1 and 2, showing a somewhat different arrangement of the cutters.

Referring to the drawing, the plaster spool embodying my invention is composed of a pair of side walls 5 connected in any suitable manner with a spindle or barrel 6 upon which the plaster or other material 7 is wound. Each of the side walls 5 is provided with a cutting edge 8 extending about its periphery. In the present instance this cutting edge consists of a plurality of sharp serrations or saw-teeth formed in the edge of the side wall, although it will be apparent that the edge of the side wall may be merely sharpened without departing from the spirit and scope of my invention.

In the embodiment of the invention shown in Figs. 1 and 2 the edge of each side wall is bent to provide a shoulder or rounded portion 9 which terminates in the serrations 8, which rounded portion serves to strengthen the wall adjacent the cutting edge and permits the cutting edge to be inclined toward the other wall and yet remain substantially in the plane of the wall upon which it is formed.

In the embodiment of the invention shown in Figs. 3 and 4 the serrations 11 are disposed radially of their end wall and those of one wall are substantially parallel to those of the other. In this embodiment the bent portions 12, similar to the bent portions 9, are provided adjacent and inwardly of these cutting edges and serve merely to stiffen the walls.

When it is desired to cut off a portion of the material wound upon the spool this portion is merely unwound and laid over against one of the cutting edges formed about the periphery of the walls and held thereagainst by the operator while the end extending beyond the edge is pulled to cut the material. It will be apparent that no additional members are required to provide the spool herein described with means for cutting the material wound thereon and that a finished spool made in pursuance of my invention may be cheaply constructed and will be effcient in operation.

It is thought that the invention and many of its attendant advantages will be understood from the foregoing without further description and it will be obvious that various changes may be made in the form and construction of the side walls of the spool, as for instance it may be found desirable to only provide one side wall with a cutting edge, without departing from the spirit or scope of the invention or sacrificing any of its material advantages, the forms hereinbefore disclosed being merely preferred embodiments thereof.

I claim:

An adhesive plaster package comprising a spool having circular ends provided with serrated cutting edges, and a plaster bandage wound on said spool.

PERRY S. BAUER.

Witnesses:
  C. J. SCHMIDT,
  T. P. HAMILTON.